(12) United States Patent
Yi

(10) Patent No.: US 8,145,163 B2
(45) Date of Patent: Mar. 27, 2012

(54) METHODS OF DETECTION OF RECEIVED SIGNAL IN COMMUNICATION SYSTEM

(75) Inventor: Sang Mi Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 558 days.

(21) Appl. No.: 12/361,189

(22) Filed: Jan. 28, 2009

(65) Prior Publication Data

US 2009/0221251 A1   Sep. 3, 2009

(30) Foreign Application Priority Data

Jan. 28, 2008   (KR) .................. 10-2008-0008673

(51) Int. Cl.
*H04B 15/00* (2006.01)

(52) U.S. Cl. ............. 455/226.3; 455/226.2; 455/67.13; 455/135; 455/277.2

(58) Field of Classification Search .......... 455/226.3, 455/226.1; 375/347; 702/69
See application file for complete search history.

(56) References Cited

U.S. PATENT DOCUMENTS

| | | | | |
|---|---|---|---|---|
| 5,193,102 A * | 3/1993 | Meidan et al. | ................ | 375/132 |
| 7,433,432 B2 * | 10/2008 | Hoo | ................ | 375/347 |
| 7,639,735 B1 * | 12/2009 | Dick et al. | ................ | 375/227 |
| 7,873,324 B2 * | 1/2011 | Wu et al. | ................ | 455/67.13 |
| 2002/0057752 A1 * | 5/2002 | Denno | ................ | 375/346 |
| 2002/0196510 A1 * | 12/2002 | Hietala et al. | ................ | 359/189 |
| 2004/0208254 A1 * | 10/2004 | Lee et al. | ................ | 375/260 |

* cited by examiner

*Primary Examiner* — Edward Urban
*Assistant Examiner* — Stacey Sorawat
(74) *Attorney, Agent, or Firm* — Birch, Stewart, Kolasch & Birch, LLP

(57) ABSTRACT

A method of detecting a received signal, which is received by a receiving side of a communication system, is disclosed. The present invention includes comparing signal quality relevant information of the received signal to a prescribed reference value, selecting a pre-processing scheme to be applied to the received signal according to a result of the comparing step, and detecting a signal by applying the selected pre-processing scheme to the received signal. Thus, a pre-processing scheme for received signal detection can be differently applied according to a size of quality relevant information of a received signal. Accordingly, the present invention lowers a false alarm probability and/or a miss occurrence probability of the received signal, thereby raising a signal detection probability.

4 Claims, 4 Drawing Sheets

METHODS OF DETECTION OF RECEIVED SIGNAL IN COMMUNICATION SYSTEM

CROSS-REFERENCE TO RELATED APPLICATIONS

This application claims the benefit of the Korean Patent Application No. 10-2008-0008673, filed on Jan. 28, 2008, which is hereby incorporated by reference as if fully set forth herein.

BACKGROUND OF THE INVENTION

1. Field of the Invention

The present invention relates to a communication system, and more particularly, to a method of detecting a received signal in a communication system.

2. Discussion of the Related Art

As a method for a receiving side to receive a signal transmitted by a transmitting side, there is energy detection for determining a transmitted signal by detecting energy of the transmitted signal. The energy detection is used in detecting a signal transmitted by OOK (on-off keying) modulation scheme that is used in transceiving such simple information as 'presence' and 'non-presence'. The OOK is the modulation scheme for representing digital data via presence or non-presence of a carrier. In a simple manner, it is able to represent a presence of a carrier for a predetermined duration as binary information '1'. And, it is also able to represent a non-presence of a carrier for the predetermined duration as binary information '0'.

For instance, the OOK modulation scheme is the scheme evolving from 3GPP WCDMA that is the asynchronous IMT 2000 mobile communication system and is used for HICH (hybrid ARQ indicator channel) and RGCH (relative grant channel) in 3GPP Rel-6 and 3GPP Rel-7 for implementing a system for bidirectional high speed packet transmission. And, the OOK scheme is used for E-HICH (E-DCH hybrid ARQ indicator channel) that is a channel for carrying ACK/NACK (acknowledgement/non-acknowledgement) information of uplink E-DCH (enhanced dedicated channel). According to this scheme, if information carried on E-HICH is ACK, '1' is transmitted. If the information is NACK or it is unable to determine ACK/NACK due to DTX (discontinuous transmit), '0' is transmitted. Besides, E-RGCH shall be described later in this disclosure.

A transmitted signal, which has been modulated by the OOK modulation scheme, is detected according to amplitude detection using high/low level of energy of the signal received by a receiving side. In this case, the amplitude detection is the scheme for raising detection probability of a received signal by lowering false alarm probability and miss probability of a detected signal. The 'false' means that a receiving side determines NACK/DTX information of a transmitting side as ACK information. And, the 'miss' means that a receiving side determines ACK information of a transmitting side as NACK/DTX information. In this case, the false of the detected signal can be more fatal than the miss thereof. In case of the miss detection of HICH, the missed signal is retransmitted by a transmitting side, whereby such a problem as additional consumption of radio resources, service delay and the like is generated. In case of the false detection of HICH, although retransmission of a corresponding signal is necessary, a transmitting side determines that the signal is correctly transmitted to a receiving side. Therefore, a fatal situation may take place. For example, reception of necessary data may not be achieved.

Generally, when a transmitting side transmits ACK, a probability density function (PDF) of a received signal can be represented as Raleigh distribution that differs in a distribution chart according to channel configurations of transmitting and receiving sides due to a migration of a transmitting side or an existence of multi-path. When a transmitting side transmits NACK or DTX, a probability density function (PDF) of a received signal can be represented as Gaussian distribution that differs in a distribution chart.

When a received signal is determined as NACK or ACK using a probability density function of a received signal, it is able to define a value of amplitude or power corresponding to a boundary of NACK/ACK as a prescribed threshold value. In this case, the threshold value is related to an allowable false alarm probability specified in a false alarm probability curve based on DTX in a signal transmitted by a transmitting side only. In particular, even if a probability density function of a received signal has the same distribution chart, a threshold value may be different to what value is designated to an allowable false alarm probability. In case of attempting to lower a false alarm probability, a threshold value can be raised. In case of attempting to raise a false alarm probability, a threshold value can be lowered. In the following description, a method for a receiving side to detect a signal carried over a fading or non-fading channel according to a related art is described.

Generally, a signal received by a receiving side can be represented in a manner of multiplying a transmitted signal by a channel component and then adding a noise thereto.

$$y = \sqrt{P_x} x h + n \qquad \text{[Formula 1]}$$

In Formula 1, 'y' indicates a received signal in a receiving side, 'x' indicates an OOK (on-off keying) modulated transmitted signal, and 'h' indicates a channel component. And, 'Px' indicates a power of the transmitted signal. Moreover, 'n' indicates a noise component.

The received signal y passes through a channel estimation and is then channel-compensated, as shown in Formula 2. In Formula 2, 'h*' indicates a conjugate complex number of the channel component and 'y·h*' indicates a channel-compensated received signal.

$$y \cdot h^* = \sqrt{P_x} \cdot x \cdot |h|^2 + n \cdot h^* \qquad \text{[Formula 2]}$$

In the above channel compensation, a receiving side multiplies a received signal by information of a channel estimated from such a reference channel as a pilot channel. Since channel information generally includes size information together with phase information, channel compensation is performed in a manner of multiplying the received signal by a conjugate complex number of channel information obtained for compensation for size distortion and phase distortion attributed to channel influence.

A receiving side should determine whether a transmitted signal is '0' or '1' for a channel-compensated received signal. In this case, in order to reduce a false alarm probability and a miss occurrence probability and to raise a detection probability, a normalization scheme is applied. In particular, a distribution of a received signal is modified suitably for an energy detection scheme through a normalization process.

Two kinds of methods are generally provided for the normalization scheme. First, a received signal is normalized into a channel component. Second, a received signal is normalized into a noise component. The channel component normalization method can be categorized into a method of normalization into a power component of channel and a method of normalization into an amplitude power component of channel. In the following description, the channel compensation and/or normalization scheme shall be named a pre-processing.

Formulas 3 to 5 show representative schemes for normalizing a channel-compensated received signal, in which normalizations are executed using channel power component, channel amplitude component and noise signal power, respectively. In general, a noise signal is represented as Gaussian distribution (Size 0: center, Dispersion: $\sigma^2$). In this case, a power of the noise signal means a mean power of the noise signal. And, the mean power of the noise signal is $\sigma^2$.

$$y \cdot h^*/|h|^2 = (\sqrt{P_x} \cdot x|h|^2 + n \cdot h^*)/|h|^2 \quad \text{[Formula 3]}$$

$$y \cdot h^*/|h| = (\sqrt{P_x} \cdot x|h|^2 + n \cdot h^*)/|h| \quad \text{[Formula 4]}$$

$$y \cdot h^*/\sigma^2 = (\sqrt{P_x} \cdot x|h|^2 + n \cdot h^*)/\sigma^2 \quad \text{[Formula 5]}$$

In a related art system, one of the schemes shown in Formulas 3 to 5 is selected according to a system and is then fixedly used for the corresponding system.

SUMMARY OF THE INVENTION

Technical Problem

However, a scheme for raising a detection probability in all intervals irrespective of such signal quality relevant information as a size of a received signal, a signal to noise ratio of a received signal and the like has not been discovered.

Technical Solution

Accordingly, the present invention is directed to a method of detecting a received signal in a communication system that substantially obviates one or more of the problems due to limitations and disadvantages of the related art.

An object of the present invention is to provide a method of detecting a received signal in a communication system, by which a detection probability can be raised in all intervals.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of detecting a received signal, which is received by a receiving side of a communication system, includes comparing signal quality relevant information of the received signal to a prescribed reference value, selecting a pre-processing scheme to be applied to the received signal according to a result of the comparing, and detecting a signal by applying the selected pre-processing scheme to the received signal.

Preferably, the signal quality relevant information of the received signal includes any one of a signal to noise ratio (SNR) of the received signal, a per-bit energy to noise ratio (Eb/No) of the received signal, a per-chip energy to interference ratio (Ec/Io) of the received signal and a power of the received signal.

More preferably, the received signal is a signal to which either OOK (on-off keying) modulation or BPSK (binary phase shift keying) modulation is applied.

Preferably, the pre-processing scheme includes at least one of channel compensation for the received signal and normalization for the received signal.

Preferably, the pre-processing scheme includes normalization based on each of a channel power level, a channel size and a noise power.

Preferably, the prescribed reference value is determined according to an allowable false alarm probability of the received signal and/or an allowable miss occurrence probability of the received signal.

It is to be understood that both the foregoing general description and the following detailed description are exemplary and explanatory and are intended to provide further explanation of the invention as claimed.

Advantageous Effects

Accordingly, a method of detecting a received signal in a communication system according to the present invention provides the following effects or advantages.

First of all, it is able to lower a false alarm probability of a received signal by adaptively applying a pre-processing scheme for received signal detection according to a size of quality relevant information of the received signal.

Secondly, it is able to raise a capacity of a whole system and a Through-put of a terminal by raising a detection probability in a signal detection scheme that applies energy detection.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
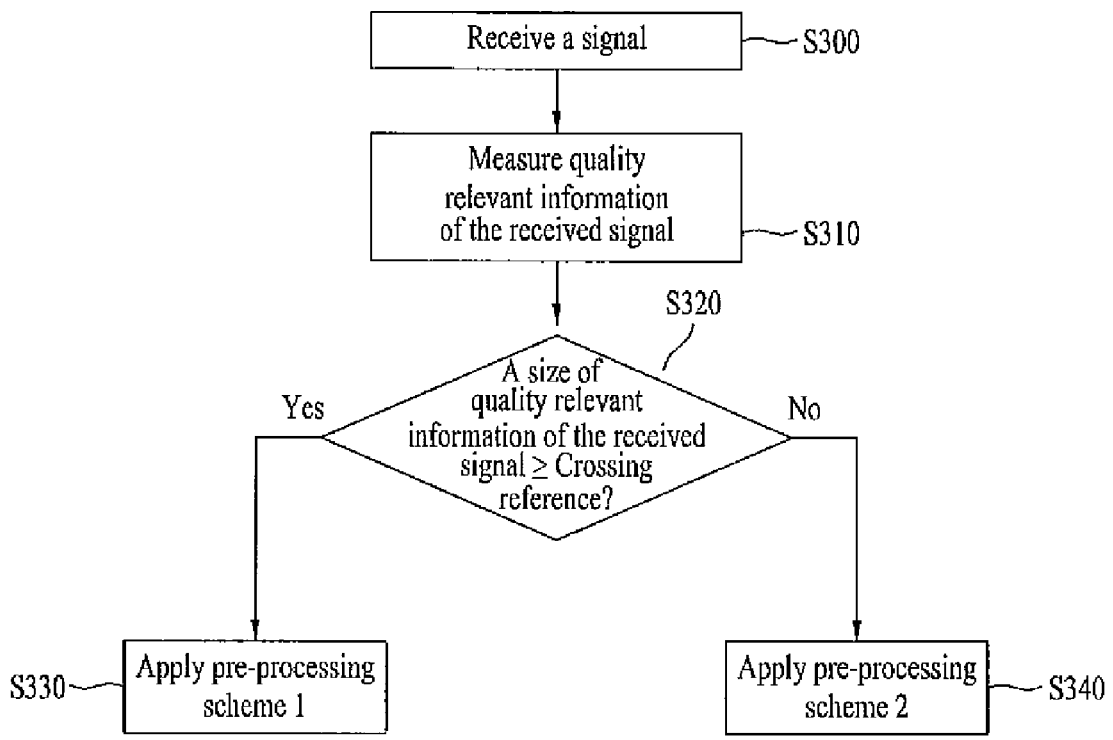
FIG. 1 is a flowchart for a method of variably selecting one from at least two available signal detection schemes according to a size of signal quality relevant information of a received signal in a receiving side according to one embodiment of the present invention.

Reference will now be made in detail to the preferred embodiments of the present invention, examples of which are illustrated in the accompanying drawings.

First of all, embodiments explained in the following description are the examples for applying the technical features of the present invention to UMTS (universal mobile telecommunications system) uplink high speed packet data transfer system, which is called HSUPA (high speed uplink packet access), and E-UMTS (evolved universal mobile telecommunications system) that is called LTE (long term evolution). And, it is apparent that these embodiments are applicable to a similar mobile communication system such as HSPDA (high speed downlink packet access) system, IEEE 802.16m system, Wibro system and the like.

E-UMTS is the system that has been evolved from the conventional WCDMA UMTS. And, its basic standardization is ongoing to be established by 3GPP ($3^{rd}$ generation partnership project). Details of technical specifications of UMTS HSUPA and E-UMTS can refer to Releases 6 to 8 of '$3^{rd}$ Generation Partnership Project: Technical Specification Group Radio Access Network' respectively.

Communication system is widely deployed to provide various communication services including speech data, packet data and the like. This technology is available in downlink or uplink. The downlink means the communication from a base station to a terminal, while the uplink means the communication from the terminal to the base station. Generally, a base station is a fixed point for communication with a terminal in general and includes a network except a terminal in a communication system including an upper layer as well as a physical transmitting end. Therefore, a network and a base station are symmetric parts to a terminal and have the same meaning in the present invention. And, a terminal can be fixed or have mobility.

The present invention is usable for a single-carrier or multi-carrier communication system. The multi-carrier system is able to use OFDM (orthogonal frequency division multiplexing) or one of other multi-carrier modulation schemes. Moreover, the present invention is usable for a communication system that uses a single antenna or a multi-antenna.

One embodiment of the present invention proposes a scheme for detecting a received signal in a manner of adaptively selecting any one from plural available pre-processing schemes according to signal quality relevant information of a received signal in a receiving side and then applying the selected pre-processing scheme.

The present invention is applicable to a case that transceived data is binary data expressible as 'presence' or 'non-presence' In this disclosure, 'presence' is represented as 'positive', while 'non-presence' is represented as 'negative'. For clarity and convenience, in particular, 'presence' is indicated by '1' as a positive meaning and 'non-presence' is indicated by '0' as a negative meaning, and vice versa.

First of all, a signal represented as binary information is modulated in a transmitting side. As a modulation scheme, there is the above-described OOK (on-off keying) modulation scheme. And, BPSK (binary phase shift keying) modulation scheme is available as well.

The above-modulated and transmitted signal may be determined as different signal (ACK to NACK or NACK to ACK) from a real signal due to various channel configurations and noises. To prevent this, such a pre-processing scheme as channel compensation and/or normalization and the like is applied to a received signal and signal detection is then performed. In particular, it is intended to raise a signal detection probability by adaptively selecting a pre-processing scheme that has better signal detection performance according to quality relevant information of the received signal.

In this case, the pre-processing scheme can include normalization into channel component or noise component after the channel compensation proposed by Formulas 3 to 5. In the following description, the pre-processing scheme by Formula 3 is named a pre-processing scheme 1, the pre-processing scheme by Formula 4 is named a pre-processing scheme 2, and the pre-processing scheme by Formula 5 is named a pre-processing scheme 3.

In order to apply the present invention, for at least two available pre-processing schemes, information on a miss occurrence probability and/or a false alarm probability according to a size of such signal quality relevant information of a received signal as a signal to noise ratio of a received signal and the like should be provided.

Specifically, in a signal quality relevant information interval of a prescribed received signal, both a transmitting side and a receiving side should be provided with information on a pre-processing scheme that will be applied among at least two available pre-processing schemes. For example, the information is related to a method of selecting a pre-processing scheme having better detection performance. In particular, with reference to at least one prescribed threshold value, they should be provided with the information on a pre-processing scheme that will be differently applied.

In this case, it is able to determine the prescribed threshold value using a crossing reference that is a size of signal quality relevant information of a received signal at a crossing point between detection performance curves of different pre-processing schemes.

Moreover, it is able to transmit the information on the prescribed threshold value to a terminal from a base station via system information or the like. Alternatively, the terminal directly finds the information on the prescribed threshold value. Alternatively, the information on the prescribed threshold value may be the value originally stored in the base station and terminal.

The received signal quality relevant information can include a signal to noise ratio (hereinafter abbreviated SNR) of the received signal, a per-bit energy to noise ratio (Eb/No) of the received signal, a per-chip energy to interference ration (Ec/Io) of the received signal, a power of the received signal and the like.

The signal to noise ration (SNR) indicates a ratio of a power of the received signal to a white noise received by a receiving side.

The per-bit energy to noise ratio (Eb/No) of the received signal indicates a ratio of received data of an inverse-spread bit unit to a white noise received by a receiving side in case that transferred data is spread. The per-chip energy to interference ration (Ec/Io) of the received signal indicates a ratio of energy of chip unit of received data not inverse-spread in a receiving side of spread transferred data to a sum of data, which is transferred for another user, received by the receiving side, data, which is transferred for the same user, carried on a physical channel using a different spread code and a white noise. The power of the received signal means an absolute size indicated by a miliwatt (mW) unit of data power measured in the receiving side or the like.

Generally, the bigger the above values become, the better a quality of the received signal gets. While the base station and the terminal mutually share the above-mentioned basic informations, a method of adaptively selecting a signal detection scheme according to a size of signal quality relevant information of a received signal, which is proposed by one embodiment of the present invention, is applied.

FIG. 1 is a flowchart for a method of variably selecting one from at least two available signal detection schemes according to a size of signal quality relevant information of a received signal in a receiving side according to one embodiment of the present invention;

First of all, a receiving side is able to receive a signal which is transmitted by a transmitting side in a manner of being processed by such a modulation scheme for using energy detection as OOK scheme, BPSK scheme and the like [S300]. As mentioned in the foregoing description, the received signal can be a channel-coded signal, a spread signal or the like.

Subsequently, a size of quality relevant information of the received signal is measured [S310]. The size of the signal quality relevant information of the received signal is compared to a crossing reference between at least two available pre-processing schemes [S320]. According to this comparison result, the pre-processing scheme set to provide better detection performance is then selected. Referring to FIG. 1, if the size of the signal quality relevant information of the received signal is equal to or greater than the crossing reference, a pre-processing scheme 1 is selected [S330]. Otherwise, a pre-processing scheme 2 is selected [S340].

In the following description, a method of detecting transferred data using the above-selected pre-processing scheme is explained.

Figure 2:
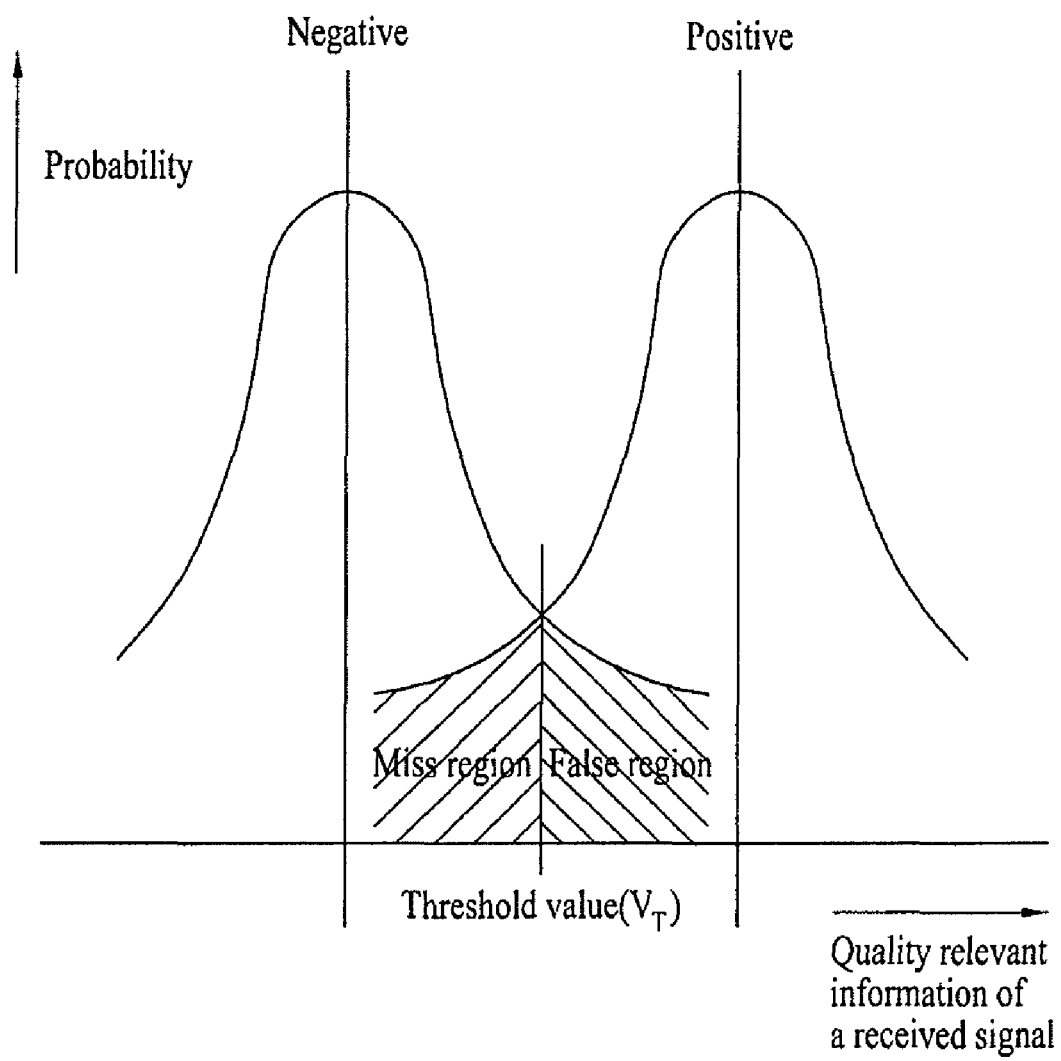
FIG. 2 is a graph for a method of detecting received data according to one embodiment of the present invention.

FIG. 2 is a graph for a method of detecting received data according to one embodiment of the present invention. First of all, since a received signal pre-processed by the process shown in FIG. 1 is a modulated signal, a detection process for determining data through demodulation is performed on the corresponding signal by a receiving side. In this case, 'detection' means a process for reconstructing a transmitted signal from received data. In the present invention, 'detection' includes demodulation of received data. In FIG. 2, an x-axis indicates a size of signal quality relevant information of a received signal and a y-axis indicates a probability of detection (or, demodulation) into 'positive' or 'negative'. Each peak of both curves has a highest probability in precisely detecting 'positive' or 'negative' from the size of the signal quality relevant information of the measured received signal, thereby indicating that a probability approaches 1. And, the probability of precise detection gradually becomes lower than 1 toward both sides of the corresponding curve centering on the peak. FIG. 2 shows that the OOK transmission scheme is applied. In FIG. 2, 'negative' indicates a case of a non-presence of transmission of carrier, while 'positive' indicates a case of a presence of transmission of carrier. In this case, assume a case that a channel configuration is represented as Gaussian probability density function.

Referring to FIG. 2, detection of a received signal into 'positive' or 'negative' depends on a comparison between a size of received signal quality relevant information and a prescribed threshold value (Vt). As mentioned in the foregoing description, a received signal may be interpreted different from information transmitted by a transmitting side due to a channel situation and the like. In particular, 'miss' for determining positive data as 'negative' may take place or 'false' for determining negative data as 'positive' may occur.

In detail, if a size of received signal quality relevant information, which is measured by a receiving side, of a signal having been transmitted as 'positive' by a transmitting side is greater than a threshold value, the receiving side also determines it as 'positive'. If the size of the received signal quality relevant information is smaller than the threshold value, the signal transmitted as 'positive' is determined as 'negative'. Thus, a region, which is determined as 'negative' because the size of the received signal quality relevant information of the signal transmitted as 'positive' is smaller than the threshold value, is named a miss region.

On the contrary, if a size of received signal quality relevant information, which is measured by a receiving side, of a signal having been transmitted as 'negative' by a transmitting side is smaller than a threshold value, the receiving side also determines it as 'negative'. If the size of the received signal quality relevant information is greater than the threshold value, the signal transmitted as 'negative' is determined as 'positive'. Thus, a region, which is determined as 'positive' because the size of the received signal quality relevant information of the signal transmitted as 'negative' is greater than the threshold value, is named a false region.

The threshold value is usable in a manner of being set to one of various values according to a system. Alternatively, it is able to use the threshold value set to a value fixed to each system. Alternatively, it is able to use the threshold value set to a variable value according to a channel situation or the lie.

As mentioned in the foregoing description, since 'false' is more fatal to a system than 'miss' in general, it is necessary to raise a threshold value. In order to obtain a specific allowable false alarm probability, a miss occurrence probability is lowered in a manner of fixing a false alarm probability within an allowable range by selecting a threshold value for determining a false region according to a system, a channel situation or the like and then adaptively selecting a pre-processing scheme according to a size of quality relevant information of a received signal. Moreover, in case that a channel configuration between a transmitting side and a receiving side is distorted due to migrations of the transmitting side and/or the receiving side or a multi-path in-between, it is able to determine the threshold value, a miss region and/or a false region in a probability density function for a channel model that reflects this distortion.

Therefore, at least one threshold value information reflecting various channel situations is originally stored in a terminal or system, is notified to a terminal from a system via system information or the like, or can be determined and then notified to a system by a terminal.

Figure 3:
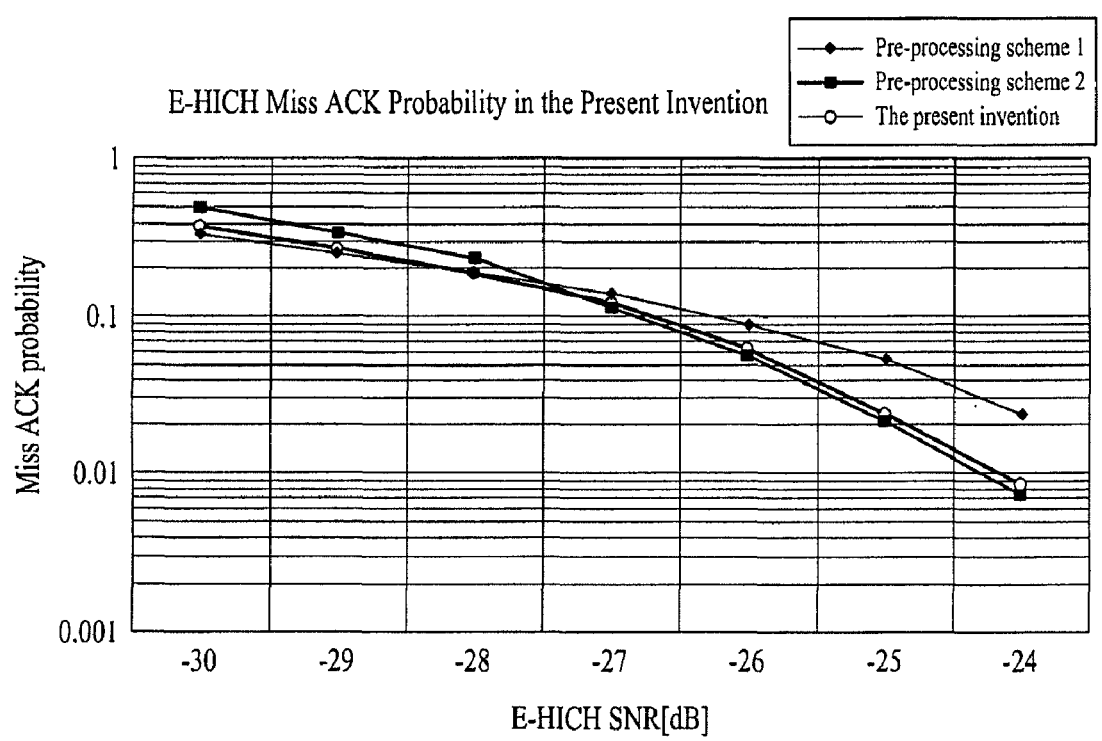
FIG. 3 is a diagram for performance comparison between a received data detecting method according to one embodiment of the present invention and a related art method.

FIG. 3 is a diagram for performance comparison between a received data detecting method according to one embodiment of the present invention and a related art method. In this case, a signal to noise ratio of a received signal is used for E-HICH as quality relevant information of the received signal. And, a preset prescribed threshold value is used. The E-HICH (E-DCH hybrid ARQ indicator channel) is a channel in HSUPA for carrying ACK (acknowledgement) or NACK (non-acknowledgement) information of E-DCH (enhanced dedicated channel) HARQ. And, a method proposed by the present invention is applicable to the E-HICH.

In particular, in case of transmitting ACK or NACK information using OOK modulation scheme, the E-HICH represents the ACK information as a case of transmitting a carrier and also represents the NACK information as DTX for not transmitting a carrier. As a test environment, ITU VA30 radio channel configuration model, which is regulated as a mobile environment for HSUPA conformance, is used.

FIG. 3 shows a signal miss probability curve in case of applying pre-processing schemes represented as Formula 3 and Formula 4 according to a signal to noise ratio and a signal miss probability curve in case of the adaptive application according to one embodiment of the present invention, i.e., in case of applying a pre-processing scheme differently by taking a prescribed reference value of a crossing reference as a reference.

Referring to FIG. 3, it can be observed that better performance is provided overall in a manner of applying a pre-processing scheme 1 if a signal to noise ratio is lower than −28 dB, which is a crossing reference. And, it can be also observed that better performance is provided overall in a manner of applying a pre-processing scheme 2 if a signal to noise ratio is greater than −28 dB.

The present invention is applicable to E-RGCH (E-DCH relative grant channel) capable of applying energy detection in HSUPA system. The E-RGCH is the channel for instructing to increase, decrease or maintain a transmission power level of E-DCH and is able to transmit information indicating an increment, decrement or constancy of a data transfer rate.

Figure 4:
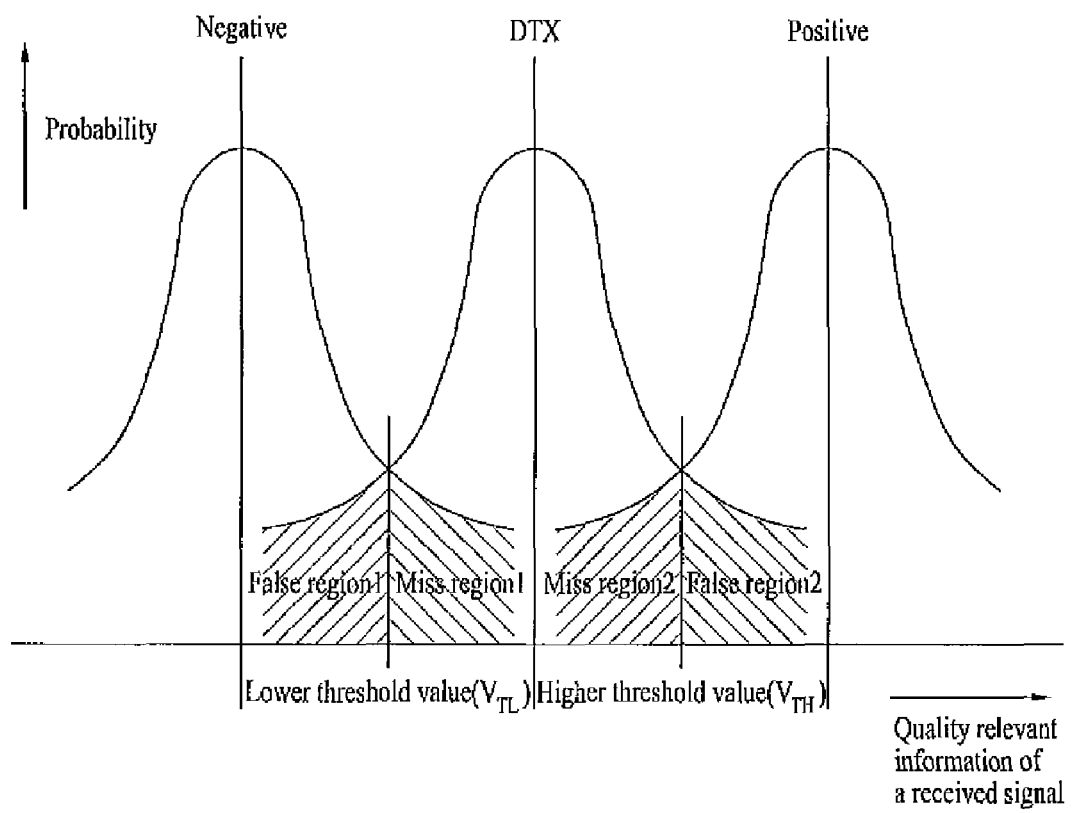
FIG. 4 is a diagram for a method of detecting received data according to another embodiment of the present invention.

FIG. 4 is a diagram for a method of detecting received data according to another embodiment of the present invention. In case that a transmission signal indicates one of three kinds of information such as 'increment', 'decrement' and 'constancy' as well as 'on' or 'off', a method of determining a threshold value is explained with reference to FIG. 4 as follows. For clarity of this description of FIG. 4, 'increment' is represented as 'positive', 'decrement' is represented as 'positive', and 'constancy' is represented as 'DTX'. It is able to represent 'increment' as 'negative' and it is also able to represent 'decrement' as 'positive' and vice versa.

In this case, a false region 1 and a miss region 1 are determined centering on a lower threshold value $V_{TL}$ between a Gaussian probability density function curve of a received signal indicating 'decrement' and a Gaussian probability density function curve of a received signal indicating 'constancy'. And, a miss region 2 and a false region 2 are determined centering on a higher threshold value $V_{TH}$ between a Gaussian probability density function curve of a received signal indicating 'constancy' and a Gaussian probability density function curve of a received signal indicating 'increment'.

Accordingly, it is able to lower a false alarm probability and a miss occurrence probability in a manner of selecting a pre-processing scheme according to received signal quality information by determining the higher/lower threshold value. Thus, if the present invention is applied to E-RGCH, each transmitting side is able to perform data transfer rate control or power control more accurately, thereby reducing interference in-between.

The present invention is applicable to PHICH (physical HARQ indicator channel) capable of applying energy detection in LTE system. As the PHICH is the channel for carrying ACK and NACK information of HARQ, the energy detection is applicable. In particular, if the present invention is used to transmit a response signal (e.g., ACK/NACK) indicating a presence or non-presence of a normal reception of a received signal, new transmission or retransmission between users can be efficiently performed over a shared channel. When OFDM based channel sharing system such as LTE system is used, since inter-user resource allocation scheme gets more complicated than the related art dedicated channel scheme, it is considerably necessary to reduce retransmissions by raising detection probability. Therefore, the present invention is more useful.

In the above detailed description of the invention, a communication performing process between a transmitting side and a receiving side is mainly explained to help the understanding of the present invention and its embodiments. In this case, the transmitting side can include a terminal or a base station of a network, while the receiving side includes a base station of a network or a terminal. A terminal used in this disclosure can be replaced by one of other terminologies having the same meaning. For instance, 'terminal' can be replaced by such a terminology as a mobile station, a mobile terminal, a communication terminal, a user equipment, a mobile device and the like. And, 'base station' can be replaced by such a terminology as a fixed station, a Node B (NB), an eNode B (eNB) and the like.

Accordingly, the present invention is applicable to PHICH (physical HARQ indicator channel) capable of applying energy detection in LTE system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of detecting a received signal at a receiving side in a communication system, the method comprising:
   comparing signal quality relevant information of the received signal to a prescribed reference value;
   selecting a pre-processing scheme to be applied to the received signal based on a result of the comparing;
   pre-processing the received signal based on the selected pre-processing scheme; and
   detecting the pre-processed signal,
   wherein the step of selecting comprises:
      selecting a first pre-processing scheme when the signal quality relevant information of the received signal is the same as or larger than the prescribed reference value, and
      selecting a second pre-processing scheme when the signal quality relevant information of the received signal is smaller than the prescribed reference value,
      wherein the step of pre-processing comprises:
      performing a channel compensation for the received signal, and
      normalizing the channel compensated received signal using a channel power component if the first pre-processing scheme is selected or using a channel amplitude component if the second pre-processing scheme is selected.

2. The method of claim 1, wherein the signal quality relevant information of the received signal comprises any one of a signal to noise ratio (SNR) of the received signal, a per-bit energy to noise ratio (Eb/No) of the received signal, a per-chip energy to interference ratio (Ec/Io) of the received signal and a power of the received signal.

3. The method of claim 2, wherein the received signal is a signal to which either OOK (on-off keying) modulation or BPSK (binary phase shift keying) modulation is applied.

4. The method of claim 1, wherein the prescribed reference value is determined according to an allowable false alarm probability of the received signal and/or an allowable miss occurrence probability of the received signal.

* * * * *